US005307840A

United States Patent [19]

Shields et al.

[11] Patent Number: 5,307,840

[45] Date of Patent: May 3, 1994

[54] INK TANK/PUMP SYSTEM

[75] Inventors: Gerald N. Shields, Lake Forest; Kenneth R. Luedtke, Wilmette, both of Ill.

[73] Assignee: Graymills Corporation, Chicago, Ill.

[21] Appl. No.: 53,104

[22] Filed: Apr. 26, 1993

[51] Int. Cl.[5] .............................................. A01G 25/09

[52] U.S. Cl. .................................... 137/899; 137/565; 137/571

[58] Field of Search ................ 137/899, 343, 571, 565

[56] References Cited

U.S. PATENT DOCUMENTS 3,797,744 3/1974 Smith ................................ 137/899
4,241,755 12/1980 Snyder ................................ 137/899
4,326,013 4/1982 Jacobi et al. ........................ 137/899
5,042,840 8/1991 Rieple et al. ........................ 137/899

*Primary Examiner*—A. Michael Chambers

*Attorney, Agent, or Firm*—Wood, Phillips, VanSanten, Hoffman & Ertel

[57] ABSTRACT

In order to facilitate the transfer and utilization of a tank of ink in a printing facility, an ink tank/pump system includes a plurality of ink tanks each adapted to accommodate a pump for supplying a press with ink from the tank. The system also includes a transfer cart having a generally flat, horizontal surface to support at least one of the ink tanks thereon. The transfer cart is adapted to move from one point to another, e.g., from an ink tank storage location to a press location. The system still further includes a receiver cart having a generally flat, horizontal surface to support at least one of the ink tanks thereon. With this arrangement, the tank supporting surfaces of the transfer and receiver carts are alignable, which accommodates slidably moving the ink tanks therebetween, and the ink tanks may include a splash resistant lip.

21 Claims, 3 Drawing Sheets

INK TANK/PUMP SYSTEM

FIELD OF THE INVENTION

The present invention generally relates to supplying ink, coatings, varnish and other materials generally applied by a press in a press room and, more particularly, to an ink tank and pump system for a press room.

BACKGROUND OF THE INVENTION

For purposes of operating a press room, especially of the flexo/gravure type, there are various different types of equipment that are typically required. It is known, however, that a steady supply of ink is always needed and, thus, the supply must regularly be brought from a storage location to the press room on an ongoing basis. Due to the significant requirement for this material, there has been recognition of the need for improvements in the delivery and utilization system therefor.

More specifically, it is known to be important to have ink available to a press at all times. It is likewise essential to see that downtime during replenishment of the supply of ink to a press is minimized to the extent possible. Otherwise, the press room will experience a degree of inefficiency that is unacceptable in modern practice.

If at all possible, it would be advantageous to be able to have a virtually continuous ink supply available in a press room. For instance, it would be highly desirable to have duplicate ink tanks, each having its own pump, present on each line in a press room such that, as soon as one ink tank is depleted it can either be refilled from a bulk supply source such as a five gallon bucket or the like or, alternatively, the other tank can immediately be connected to the line in order to reduce or eliminate downtime. In this manner, a full ink tank/pump could then be brought to the line immediately following the switch over to replace the depleted ink tank/pump.

Furthermore, it is essential to have another tank available during changeover from one color of ink to another. It is not possible in such case to simply add ink to a tank that was just used for a different color of ink. In order to avoid downtime, it would be desirable to have a tank of the new, changeover color available immediately.

In addition, it would desirable to be able to prevent the ink from splashing out of the tank such as during transport from the ink room to the press. This would be especially critical in the event that each ink tank was set up with its own pump in a "ready" condition in a storage location before delivery to the line in the press room. Otherwise, the ink would be likely to spill or from the tank and, thereby, cause a potential hazard for the health and safety of workers in and around the press room.

The present invention is directed to overcoming one or more of the foregoing problems and achieving one or more of the resulting objects.

SUMMARY OF THE INVENTION

It is therefore a principal object of the present invention to provide an ink tank/pump system for enhancing the efficiency of a press room. It is a further object of the present invention to provide such a system which incorporates duplicate tanks at each line in a press room, each having its own pump. It is an additional object of the present invention to provide an ink tank/pump system which enhances health and safety within a press room.

Accordingly, the present invention is directed to an ink tank/pump system wherein a plurality of ink tanks each are adapted to accommodate a pump for supplying a press with ink from the ink tank. A transfer cart is provided having a generally flat, horizontal surface for supporting at least one of the ink tanks thereon. Means are associated with the transfer cart for moving the transfer cart from one point to another. A receiver cart at press side is also provided having a generally flat, horizontal surface for supporting at least one of the ink tanks thereon. With this arrangement, the tank supporting surfaces of the transfer cart and the receiver cart are alignable for slidably moving the ink tanks therebetween.

In a preferred embodiment, the transfer cart has a first end or side for slidably receiving at least one of the ink tanks thereon and a second end with a handle for displacing the transfer cart from a storage location for the ink tanks to a press location in alignment with the receiver cart. The moving means preferably includes a plurality of wheels positioned under or alongside the supporting surface of the transfer cart which cart has a docking edge to be placed in abutment with a corresponding docking edge of the receiver cart. Still additionally, the transfer cart is advantageously generally rectangular having a pair of spaced, parallel rails on opposite sides thereof and also having a stop at one end cooperating with the side rails for limiting the ink tanks to linear sliding movement thereon.

As for other details of the invention, the transfer cart and the receiver cart are both preferably generally rectangular. It is also highly advantageous for both the transfer cart and the receiver cart to have a pair of spaced, parallel side rails as well as a central rail intermediate the side rails for thereby slidingly accommodating at least a pair of the ink tanks in side-by-side relation thereon. Still further, the receiver cart preferably has a stop at one end cooperating with the side rails for limiting the ink tanks to linear sliding movement thereon.

In a most highly preferred embodiment, the ink tank/pump system is such that the ink tanks each are generally rectangular in shape and have a bottom wall sloped downwardly from opposite sides thereof. The sloped bottom wall directs ink in the ink tank into a sump which receives an intake portion of a pump. With this arrangement, the ink tanks each also have an inwardly directed splash resistant lip at an upper edge remote from the sloped bottom wall to confine ink to the tank during movement thereof.

More specifically, the ink tanks preferably each have a continuous side wall terminating in the splash resistant lip which has a unique profile for protecting against spillage during movement. The lip advantageously has an inwardly curved horizontal portion to resist splashing of the ink, a short vertically upwardly extending portion, and an outwardly directed horizontal portion generally parallel to but spaced above the inwardly curved horizontal portion. Still additionally, a pump supporting plate is preferably configured for mating engagement with the outwardly directed horizontal portion of the splash resistant lip about the perimeter thereof.

With this configuration, the entirety of the ink tank including the splash resistant lip is advantageously formed of a plastic material and the lip also has a positioning flange for the pump supporting plate. The pump supporting plate serves as a lid for the tank with the positioning flange extending vertically upwardly from the outwardly directed horizontal portion of the lip and about the perimeter thereof. In particular, the positioning flange preferably extends vertically upwardly by a distance generally the same as or greater than the thickness of the pump supporting plate to confine the pump supporting plate and the pump against movement relative to the generally rectangular ink tank.

In addition to these advantages, the positioning flange holds any ink which might be poured or splashed on the pump supporting plate or lid within the confines of the tank.

In one embodiment, the ink tanks each have a generally horizontal bottom support surface positioned below the sloped bottom wall so as to be slidable on the tank supporting surfaces of the transfer cart and the receiver cart. As previously mentioned, the transfer cart preferably has a docking edge which is adapted to be placed in abutment with a corresponding docking edge of the receiver cart to accommodate sliding movement of the ink tanks therebetween.

Other objects, advantages and features of the present invention will become apparent from a consideration of the following specification taken in conjunction with the accompanying drawings.

DETAILED DESCRIPTION OF THE PREFERRED EMBODIMENT

Figure 1:
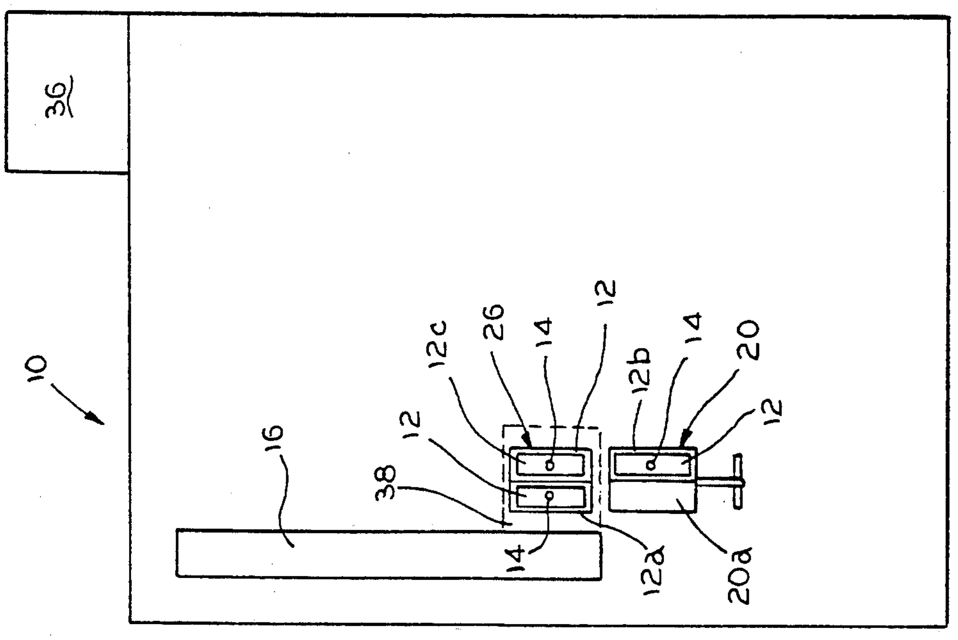
FIG. 1 is a schematic illustration of an ink tank/pump system in accordance with the present invention.

Referring to the drawings, and with reference first to FIG. 1, the reference numeral 10 designates generally a press room having an ink tank/pump system in accordance with the present invention. The ink tank/pump system includes a plurality of ink tanks 12 each adapted to accommodate a pump 14 for supplying a press 16 with ink 18 from the ink tank 12 (see, also, FIG. 2). A transfer cart 20 is provided having a generally flat, horizontal surface 22 for supporting at least one of the ink tanks 12 thereon. Means associated with the transfer cart 20 in the form of a plurality of wheels 24 positioned under or alongside the supporting surface 22 are provided for moving the transfer cart 20 from one point to another. A receiver cart 26 is provided having a generally flat, horizontal surface 28 for supporting at least one of the ink tanks 12 thereon. With this arrangement, the tank supporting surfaces 22 and 28 of the transfer cart 20 and the receiver cart 26 are alignable for slidably moving the ink tanks 12 therebetween.

Figure 4:
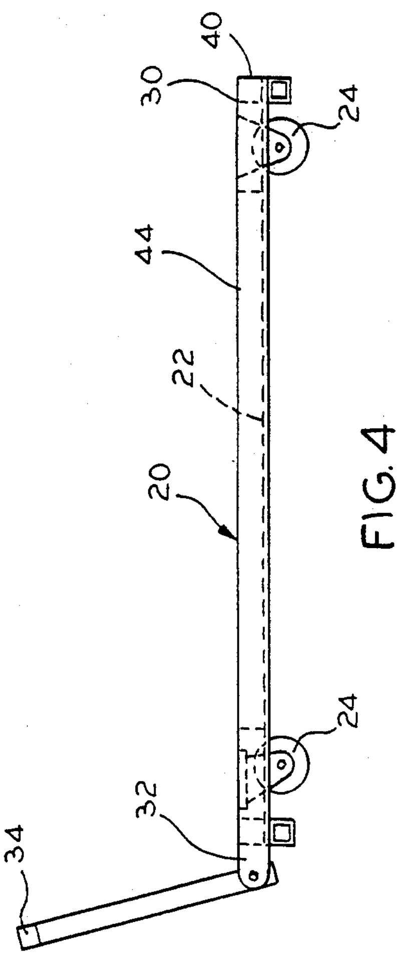
FIG. 4 is a side elevational view of a transfer cart for the system illustrated in FIG. 1.
Figure 5:
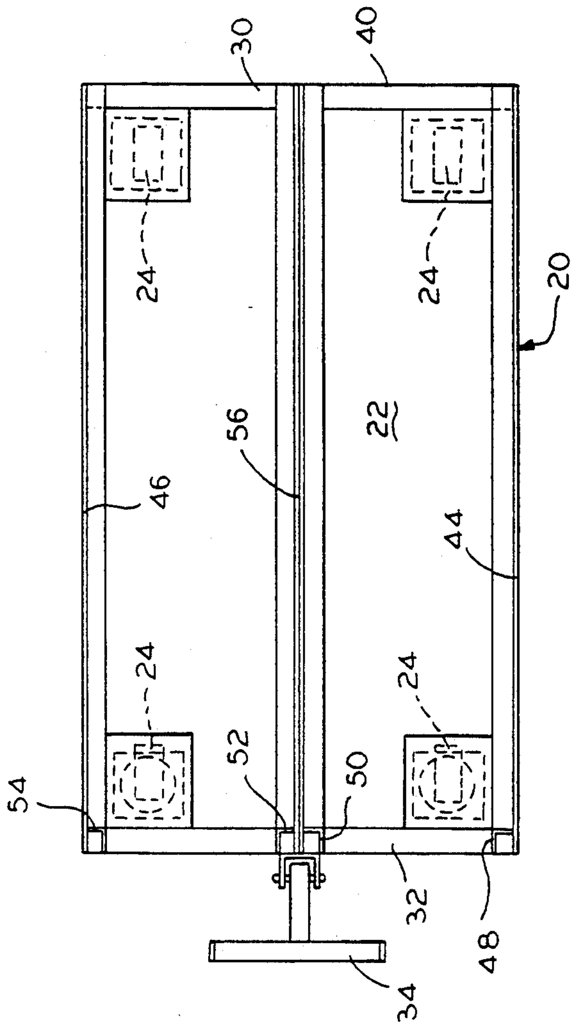
FIG. 5 is a top plan view of the transfer cart of FIG. 4 for the system illustrated in FIG. 1.
Figure 3:
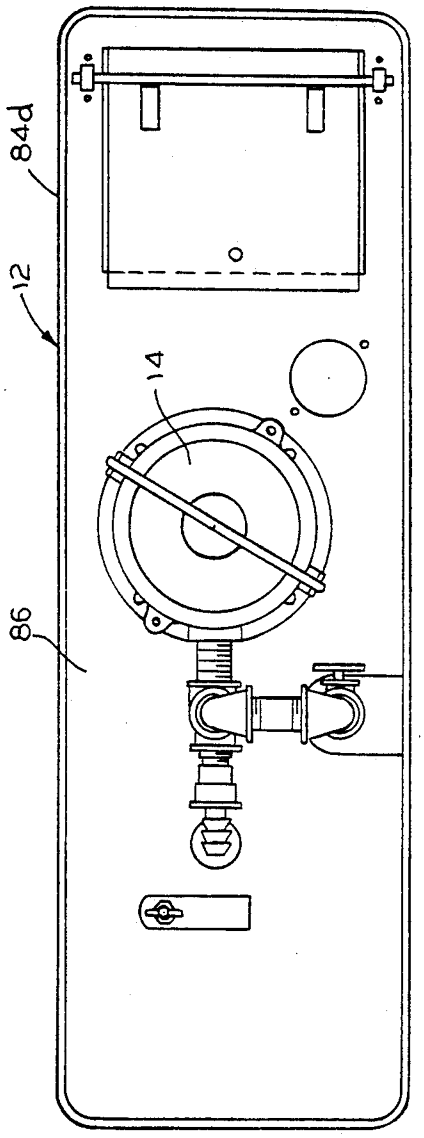
FIG. 3 is a top plan view of an ink tank and pump for the system illustrated in FIG. 1.
Figure 2:
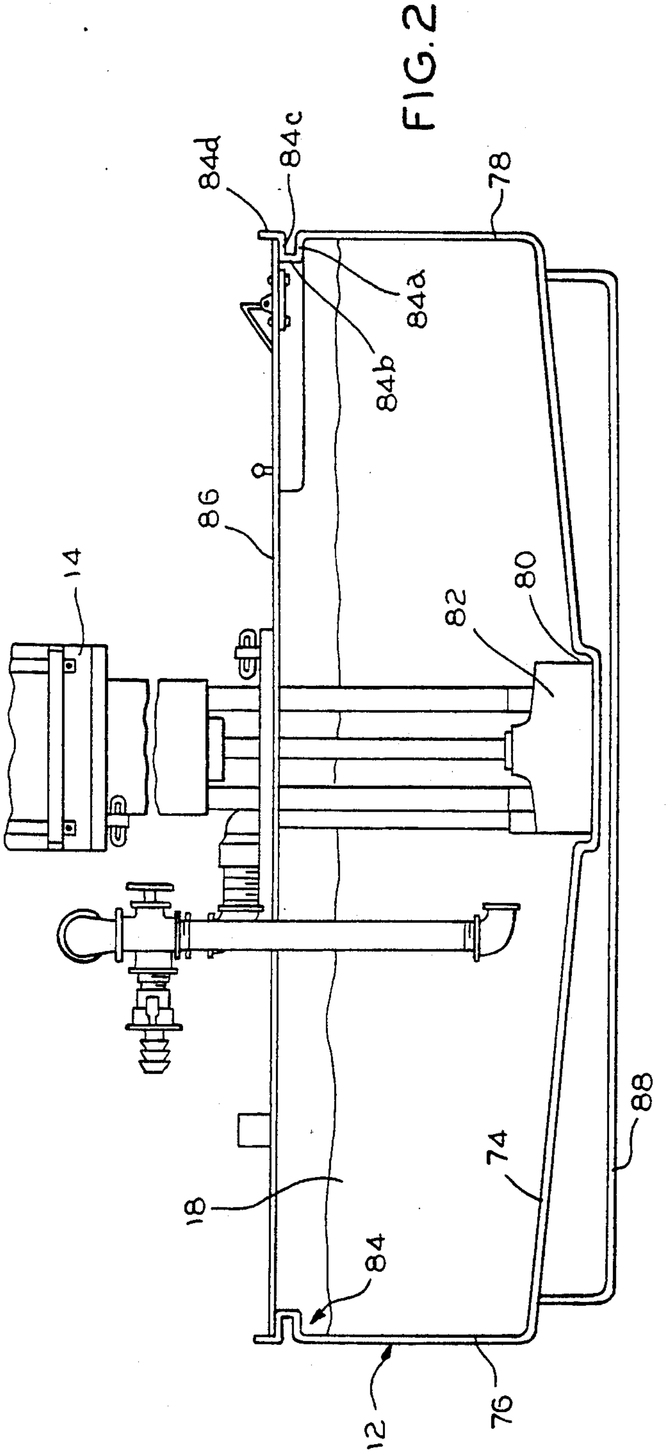
FIG. 2 is a cross-sectional view of an ink tank and pump for the system illustrated in FIG. 1.

Referring specifically to FIGS. 4 and 5, the transfer cart 20 has a first end or side 30 for slidably receiving at least one of the ink tanks 12 thereon and a second end 32 with a handle 34 for displacing the transfer cart 20 from a storage location 36 for the ink tanks 12 to a press location 38 in alignment with the receiver cart 26 (see, also, FIG. 1). The transfer cart 20 will, therefore, be understood to have a docking edge 40 to be placed in abutment with a corresponding docking edge 42 of the receiver cart 26. Still additionally, and referring to FIGS. 4 through 8, the transfer cart 20 and the receiver cart 26 are both generally rectangular and, as shown in FIGS. 2 and 3, it will be seen that the ink tanks 12 are also suitably formed to be generally rectangular to provide a conforming configuration relative to both the transfer cart 20 and the receiver cart 26.

As best shown in FIGS. 4 and 5, the transfer cart 20 has a pair of spaced, parallel rails 44 and 46 on opposite sides thereof, and it also has a stop or stops such as 48, 50, 52 and 54 at the one end 32 opposite the docking edge 30. These stops will be understood to cooperate with the side rails 44 and 46 to limit ink tanks 12 to linear sliding movement thereon. In this connection, the transfer cart 20 also advantageously has a central rail 56 intermediate the side rails 44 and 46 so as to slidingly accommodate a pair of the ink tanks 12 in parallel, side-by-side relation thereon.

Figure 6:
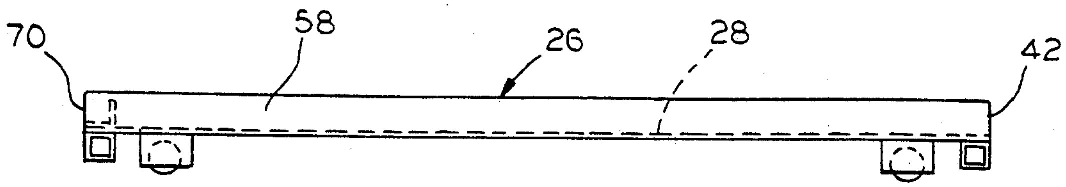
FIG. 6 is a side elevational view of a receiver cart for the system illustrated in FIG. 1.
Figure 7:
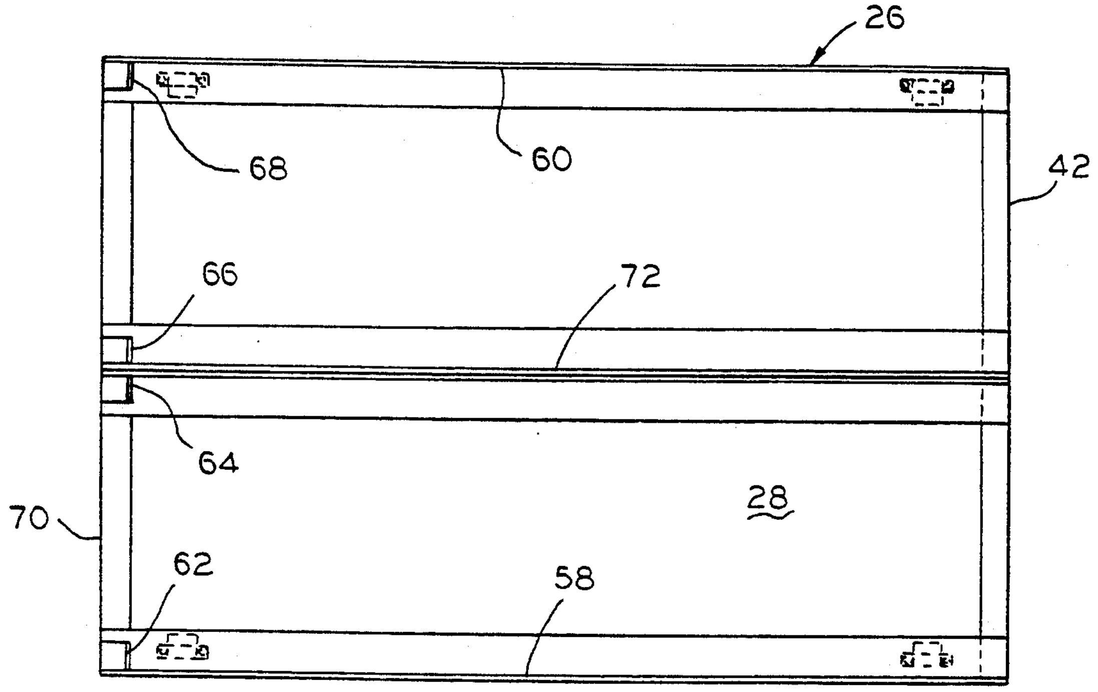
FIG. 7 is a top plan view of the receiver cart of FIG. 6 for the system illustrated in FIG. 1.
Figure 8:
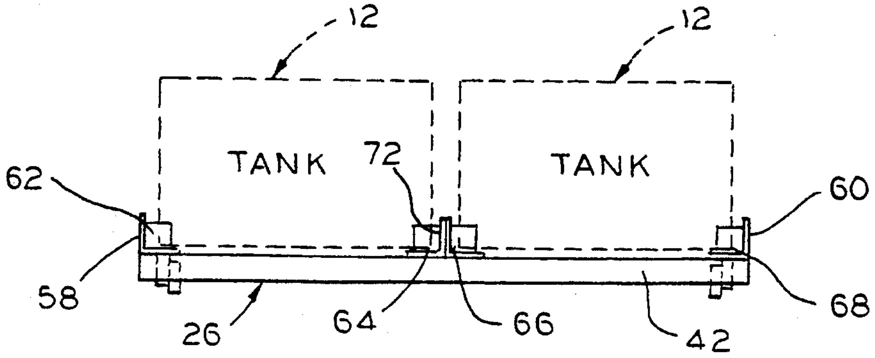
FIG. 8 is an end elevational view of the receiver cart of FIG. 6 for the system illustrated FIG. 1.

Referring now specifically to FIGS. 6 through 8, the receiver cart 26 also has a pair of spaced, parallel rails 58 and 60 on opposite sides thereof and one or more stops such as 62, 64, 66 and 68 at the end 70 opposite the docking edge 42. These stops similarly cooperate with the side rails 58 and 60 to limit the ink tanks 12 to linear sliding movement thereon. As with the transfer cart 20, the receiver cart 26 may similarly include a central rail 72 intermediate the side rails 58 and 60 to slidingly accommodate a pair of the ink tanks 12 in parallel, side-by-side relation thereon.

Referring once again to FIGS. 2 and 3, the ink tanks 12 each are preferably generally rectangular in shape having a bottom wall 74 sloped downwardly from opposite ends 76 and 78 thereof. It will be seen and appreciated that the sloped bottom wall 74 directs ink 18 in the ink tank 12 into a sump 80 which receives an intake portion 82 of the pump 14 and, thus, makes it possible to remove most of the ink from the tank at the end of a run. Still additionally, the ink tanks 12 each also have an inwardly directed splash resistant lip generally designated 84 at an upper edge remote from the bottom wall 74 thereof.

Still referring to FIGS. 2 and 3, the ink tanks 12 each preferably have a continuous side wall terminating in the splash resistant lip 84 which is configured to avoid spillage of the ink 18. The lip 84 will be seen to have an inwardly curved horizontal portion **84*a* to resist splashing of the ink 18 out of the tank 12, a short vertically upwardly extending portion 84*b*, and an outwardly directed horizontal portion 84*c* generally parallel to but spaced above the inwardly curved horizontal portion 84*a*. With this arrangement, a pump supporting plate or lid 86 is configured for mating engagement with the outwardly directed horizontal portion 84*c* of the splash resistant lip 84** about the perimeter thereof.

Advantageously, the ink tank 12 including the splash resistant lip 84 is formed of a plastic material with the lip having a continuous positioning flange **84*d* for the pump supporting plate or lid 86 extending vertically upwardly from the outwardly directed horizontal portion 84*c* entirely about the perimeter thereof. It should be understood in this connection that the pump supporting plate or lid serves as a lid to contain ink and fumes and to prevent contamination of ink from outside sources. With this arrangement, the positioning flange 84*d* preferably extends vertically upwardly by a distance generally the same as or greater than the thickness of the pump supporting plate or lid 86 to confine the pump supporting plate or lid 86 and the pump 14 against movement relative to the generally rectangular ink tank 12**.

As will be appreciated, the positioning flange **84*d* serves as a containment feature for any ink poured or splashed on the pump supporting plate or lid 86, particularly when the flange is formed to extend vertically upward by a distance greater than the thickness of the pump supporting plate or lid 86**.

In the preferred embodiment, the ink tanks 12 each have a generally horizontal bottom support surface 88 below the sloped bottom wall 74 so as to be slidable on the tank supporting surfaces 22 and 28 of the transfer and receiver carts 20 and 26. It also makes it possible for the ink tanks 12 to sit flat on the floor during storage. As previously discussed, the transfer cart 26 has a docking edge 40 which is adapted to be placed in abutment with a corresponding docking edge 42 of the receiver cart 26 to accommodate sliding movement of the ink tanks 12 therebetween, i.e., from one to the other.

Referring to FIG. 1, the advantages of having the transfer and receiver carts 20 and 26 both generally rectangular in shape will be appreciated. The transfer cart 20 may be docked in abutment with the receiver cart 26 substantially as shown so that an empty ink tank **12*a* may be transferred from the receiver cart 26 to the transfer cart 20 by longitudinal sliding movement whereby the empty ink tank 12*a* slides with its generally horizontal bottom support surface 88 first on the supporting surface 28 of the receiver cart 26 and then on the aligned, coplanar supporting surface 22 of the transfer cart 20. When the empty ink tank 12*a* is in the empty position 20*a* on the transfer cart 20, a full ink tank 12*b*** may then replace it.

In particular, the transfer cart 20 can then be repositioned so as to align the full ink tank **12*b* with the position previously occupied by the empty ink tank 12*a* on the receiver cart 26. Then, inasmuch as the supporting surfaces 22 and 28 of the transfer cart 20 and the receiver cart 26 are in alignment, the full ink tank 12*b* may undergo linear, i.e., longitudinal sliding movement from the transfer cart 20 onto the receiver cart 26. Once transferred, it will be appreciated that the full ink tank 12*b* will be ready to be connected to the press 16 at any point in time, e.g., when the other ink tank 12*c*** becomes empty or the color changes with a new job.

Of course, in the meantime, the transfer cart 20 may be moved to the position of another empty ink tank or, alternatively, the empty ink tank **12*a* may be returned to the storage location 36 and one or more full ink tanks may be placed on the transfer cart 20 which, of course, may be taken to the press 16 or another press in the press room 10**.

From the foregoing, it will be appreciated that the ink tank/pump system 10 accomplishes all of the objects of the invention as set forth hereinabove. It greatly facilitates the efficiency of a press room while at the same time enhancing health and safety factors by reason of the splash resistant lip which makes it possible to have pumps already in place in the ink tanks for ready connection to a press. From the foregoing, it will now be appreciated that the present invention represents a most significant improvement in press room operations.

While in the foregoing there has been set forth a preferred embodiment of the invention, it will be appreciated that the details herein given may be varied by those skilled in the art without departing from the true spirit and scope of the appended claims.

We claim:

1. An ink tank/pump system, comprising:

a plurality of ink tanks each adapted to accommodate means for supplying a press with ink from said ink tank;

a transfer cart having a generally flat, horizontal surface for supporting at least one of said ink tanks thereon;

means associated with said transfer cart for moving said transfer cart from one point to another; and a receiver cart having a generally flat, horizontal surface for supporting at least one of said ink tanks thereon;

said tank supporting surfaces of said transfer cart and said receiver cart being alignable, said transfer cart having a docking edge to be placed in abutment with a docking edge of said receiver cart to accommodate sliding movement of said ink tanks therebetween.

2. The ink tank/pump system of claim 1 wherein said transfer cart has a first end or side defining said docking edge thereof for slidably receiving at least one of said ink tanks thereon and an end with a handle for displacing said transfer cart from a storage location for said ink tanks to a press location in alignment with said docking edge of said receiver cart.

3. The ink tank/pump system of claim 1 wherein said moving means includes a plurality of wheels positioned under said supporting surface of said transfer cart.

4. The ink tank/pump system of claim 1 wherein said transfer cart is generally rectangular and has a pair of spaced, parallel rails on opposite sides thereof, said transfer cart also having a stop at one end cooperating with said side rails for limiting said ink tank(s) to linear sliding movement thereon.

5. The ink tank/pump system of claim 1 wherein said receiver cart is generally rectangular and has a pair of spaced, parallel rails on opposite sides thereof, said receiver cart also having a stop at one end cooperating with said side rails for limiting said ink tank(s) to linear sliding movement thereon.

6. The ink tank/pump system of claim 1 wherein said transfer cart and said receiver cart are both generally rectangular and have a pair of spaced, parallel side rails and a central rail intermediate said side rails to slidingly accommodate a pair of said ink tanks in side-by-side relation thereon.

7. An ink tank/pump system, comprising:

a plurality of ink tanks each having a pump for supplying a press with ink from said ink tank;

a transfer cart having a generally flat, horizontal surface for supporting at least one of said ink tanks thereon; and a receiver cart having a generally flat, horizontal surface for supporting at least one of said ink tanks thereon;

said transfer cart having a first end for slidably receiving at least one of said ink tanks thereon and a second end with a handle for displacing said transfer cart from a storage location for said ink tanks to a press location in alignment with said receiver cart, said transfer cart also having moving means including a plurality of wheels positioned under said supporting surface of said transfer cart and a docking edge to be placed in abutment with a docking edge of said receiver cart for slidably moving said ink tanks therebetween;

said tank supporting surfaces of said transfer cart and said receiver cart being alignable, said transfer cart having a docking edge to be placed in abutment with a docking edge of said receiver cart to accommodate sliding movement of said ink tanks therebetween.

8. The ink tank/pump system of claim 7 wherein said transfer cart is generally rectangular and has a pair of spaced, parallel rails on opposite sides thereof, said transfer cart also having a stop at one end cooperating with said side rails for limiting said ink tank(s) to linear sliding movement thereon.

9. The ink tank/pump system of claim 7 wherein said receiver cart is generally rectangular and has a pair of spaced, parallel rails on opposite sides thereof, said receiver cart also having a stop at one end cooperating with said side rails for limiting said ink tank(s) to linear sliding movement thereon.

10. The ink tank/pump system of claim 7 wherein said transfer cart and said receiver cart are both generally rectangular and have a pair of spaced, parallel side rails and a central rail intermediate said side rails to slidingly accommodate a pair of said ink tanks in side-by-side relation thereon.

11. An ink tank/pump system, comprising:

a plurality of ink tanks each having a pump for supplying a press with ink from said ink tank;

said ink tanks each being generally rectangular in shape and having a bottom wall sloped downwardly from opposites ends thereof, said sloped bottom wall directing ink in said ink tank into a sump receiving an intake portion of said pump, said ink tanks each also having an inwardly directed splash resistant lip at an upper edge remote from said bottom wall thereof;

a transfer cart having a generally flat, horizontal surface for supporting at least one of said ink tanks thereon;

means associated with said transfer cart for moving said transfer cart from one point to another; and a receiver cart having a generally flat, horizontal surface for supporting at least one of said ink tanks thereon;

said tank supporting surfaces of said transfer cart and said receiver cart being alignable, said transfer cart having a docking edge to be placed in abutment with a docking edge of said receiver cart to accommodate sliding movement of said ink tanks therebetween.

12. The ink tank/pump system of claim 11 wherein said ink tanks each have a continuous side wall terminating in said splash resistant lip, said lip having an inwardly curved horizontal portion to resist splashing of said ink, a short vertically upwardly extending portion, and an outwardly directed horizontal portion generally parallel to but spaced above said inwardly curved horizontal portion, and a pump supporting plate configured for mating engagement with said outwardly directed horizontal portion of said splash resistant lip about the perimeter thereof.

13. The ink tank/pump system of claim 12 wherein said splash resistant lip is formed of a plastic material and has a positioning flange for said pump supporting plate extending vertically upwardly from said outwardly directed horizontal portion about the perimeter thereof, said positioning flange extending vertically upwardly by a distance generally the same as or greater than the thickness of said pump supporting plate to confine said pump supporting plate and said pump against movement relative to said generally rectangular ink tank.

14. The ink tank/pump system of claim 12 wherein said splash resistant lip has a continuous positioning flange for said pump supporting plate extending vertically upwardly from said outwardly directed horizontal portion entirely about the perimeter thereof by a distance greater than the thickness of said pump supporting plate to retain any ink poured or splashed on said pump supporting plate while confining ink and fumes from ink within said ink tank.

15. The ink tank/pump system of claim 11 wherein said ink tanks each have a generally horizontal bottom support surface positioned below said sloped bottom wall, said support surfaces of said ink tanks being configured so as to be slidable on said tank supporting surface of said transfer cart and also so as to be slidable on said tank supporting surface of said receiver cart.

16. The ink tank/pump system of claim 11 wherein said transfer cart is generally rectangular and has a pair of spaced, parallel rails on opposite sides thereof, said transfer cart also having a stop at one end cooperating with said side rails for limiting said ink tank(s) to linear sliding movement thereon.

17. The ink tank/pump system of claim 11 wherein said receiver cart is generally rectangular and has a pair of spaced, parallel rails on opposite sides thereof, said receiver cart also having a stop at one end cooperating with said side rails for limiting said ink tank(s) to linear sliding movement thereon.

18. The ink tank/pump system of claim 11 wherein said transfer cart and said receiver cart are both generally rectangular and have a pair of spaced, parallel side rails and a central rail intermediate said side rails to slidingly accommodate a pair of said ink tanks in side-by-side relation thereon.

19. An ink tank/pump system, comprising:

a plurality of ink tanks each having a pump for supplying a press with ink from said ink tank;

said ink tanks each being generally rectangular in shape and having a bottom wall sloped downwardly from opposites ends thereof, said sloped bottom wall directing ink in said ink tank into a sump receiving an intake portion of said pump, said ink tanks each also having an inwardly directed splash resistant lip at an upper edge remote from said bottom wall thereof;

a transfer cart having a generally flat, horizontal surface for supporting at least one of said ink tanks thereon;

means associated with said transfer cart for moving said transfer cart from one point to another; and a receiver cart having a generally flat, horizontal surface for supporting at least one of said ink tanks thereon;

said tank supporting surfaces of said transfer cart and said receiver cart being alignable;

said ink tanks each having a continuous side wall terminating in said splash resistant lip and said lip having an inwardly curved horizontal portion to resist splashing of said ink, said splash resistant lip also having a short vertically upwardly extending portion and an outwardly directed horizontal portion generally parallel to but spaced above said inwardly curved horizontal portion, and a pump supporting plate configured for mating engagement with said outwardly directed horizontal portion of said splash resistant lip about the perimeter thereof;

said ink tanks each also having a generally horizontal bottom support surface positioned below said sloped bottom wall with said support surfaces of said ink tanks being configured for sliding movement, said ink tanks thereby being slidable on said tank supporting surface of said transfer cart and also being slidable on said tank supporting surface of said receiver cart, said transfer cart having a docking edge to be placed in abutment with a docking edge of said receiver cart to accommodate sliding movement of said ink tanks therebetween.

20. The ink tank/pump system of claim 19 wherein said splash resistant lip is formed of a plastic material and has a positioning flange for said pump supporting plate extending vertically upwardly from said outwardly directed horizontal portion about the perimeter thereof, said positioning flange extending vertically upwardly by a distance generally the same as or greater than the thickness of said pump supporting plate to confine said pump supporting plate and said pump against movement relative to said generally rectangular ink tank.

21. The ink tank/pump system of claim 19 wherein said transfer and receiver carts are both generally rectangular in shape and have a pair of spaced, parallel side rails, said transfer and receiver carts also both having a stop at one end opposite said docking edges thereof and cooperating with said side rails for thereby limiting said ink tank(s) to longitudinal sliding movement thereon, said transfer and receiver carts also both having a central rail intermediate said side rails to slidingly accommodate a pair of said ink tanks in side-by-side relation thereon.

* * * * *